United States Patent
Krauss et al.

(10) Patent No.: US 9,090,150 B1
(45) Date of Patent: Jul. 28, 2015

(54) OPEN ROOF CONSTRUCTION FOR A VEHICLE

(71) Applicant: Inalfa Roof Systems Group B.V., Venray (NL)

(72) Inventors: John Dean Krauss, Rochester Hills, MI (US); Marko Walhout, Venray (NL); Andrew Michael Roberts, Waterford, MI (US); Robert Rikkert, Nuenen (NL)

(73) Assignee: Inalfa Roof Systems Group B.V., Venray (NL)

(*) Notice: Subject to any disclaimer, the term of this patent is extended or adjusted under 35 U.S.C. 154(b) by 0 days.

(21) Appl. No.: 14/242,229

(22) Filed: Apr. 1, 2014

(51) Int. Cl.
*B60J 7/22* (2006.01)

(52) U.S. Cl.
CPC ........................................ *B60J 7/22* (2013.01)

(58) Field of Classification Search
CPC ........................................................ B60J 7/22
USPC ........................................................ 296/217
See application file for complete search history.

(56) References Cited

U.S. PATENT DOCUMENTS

| 6,030,027 | A  | * | 2/2000 | Graf | 296/180.1 |
| 6,669,277 | B2 | * | 12/2003 | Farber et al. | 296/217 |
| 2008/0023155 | A1 | * | 1/2008 | Beierl et al. | 160/121.1 |
| 2014/0159435 | A1 | * | 6/2014 | Vogel et al. | 296/217 |

FOREIGN PATENT DOCUMENTS

| DE | 3419900 | 11/1985 |
| DE | 102010034221 | 4/2011 |
| JP | 2009073342 | 4/2009 |

* cited by examiner

*Primary Examiner* — Dennis H Pedder
(74) *Attorney, Agent, or Firm* — Steven M. Koehler; Westman, Champlin & Koehler, P.A.

(57) ABSTRACT

An open roof construction for a vehicle comprises a stationary roof part, a roof opening provided therein and a panel movably mounted in said stationary roof part for opening and closing said roof opening. A movable wind deflector is disposed proximate a forward edge of the opening and comprises an upper elongate member extending substantially parallel to said forward edge. The wind deflector includes a flexible wind deflecting material having an upper end attached to said elongate member and a lower end attached to the stationary roof part. A movable control part extends parallel to said forward edge and was a first end attached to the stationary roof part and an opposite second end connected to the wind deflecting material at an engagement position between the upper and lower ends of the wind deflecting material.

34 Claims, 8 Drawing Sheets

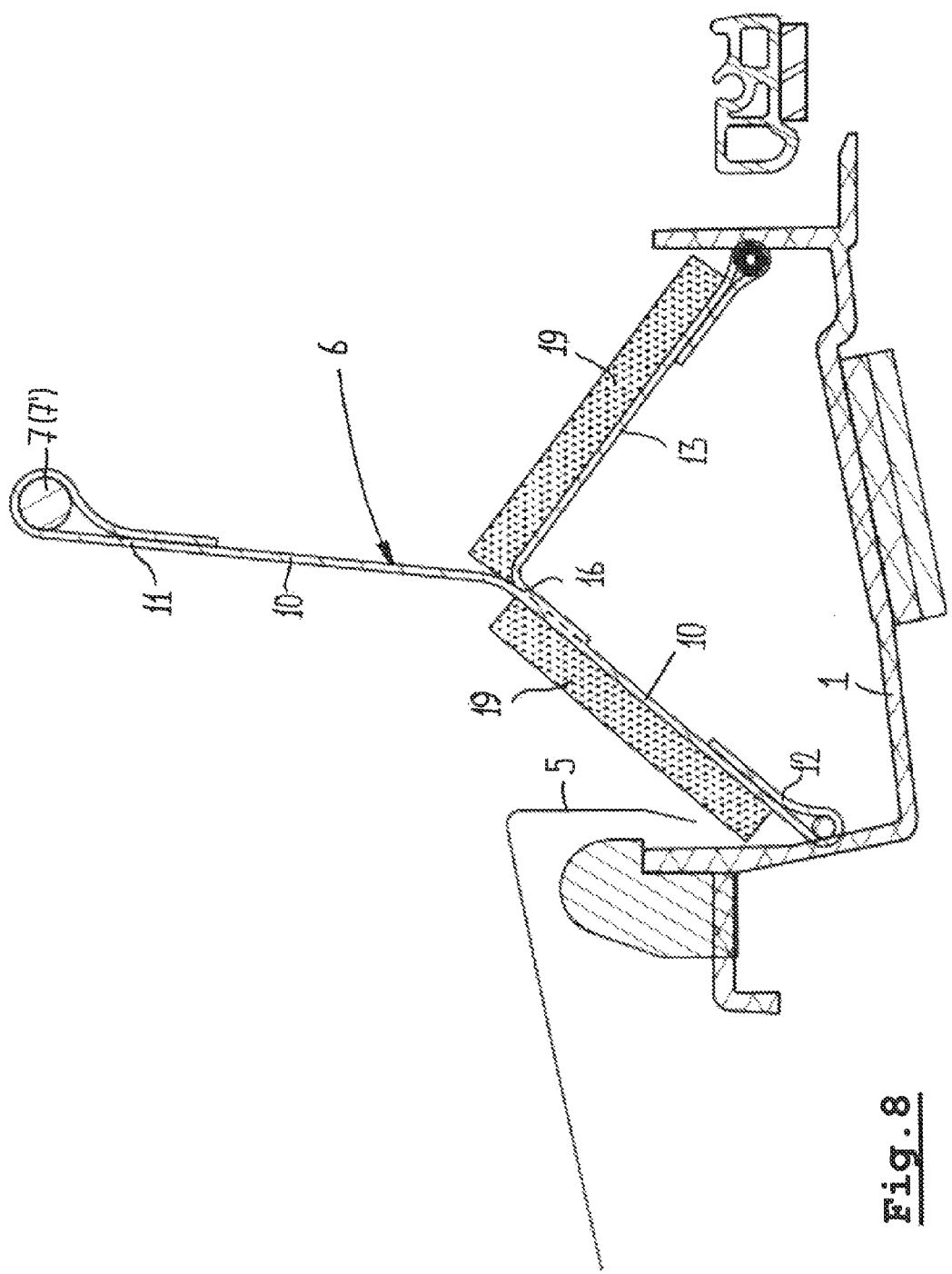

OPEN ROOF CONSTRUCTION FOR A VEHICLE

BACKGROUND

The discussion below is merely provided for general background information and is not intended to be used as an aid in determining the scope of the claimed subject matter.

Aspects of the invention relate to an open roof construction for a vehicle, comprising a stationary roof part, a roof opening provided therein, a panel movably mounted in said stationary roof part for opening and closing said roof opening, wherein said roof opening has a forward edge and wherein near to said forward edge a movable wind deflector is provided, which wind deflector comprises an upper elongate member extending substantially in parallel to said forward edge which is movable between a retracted position below the level of the stationary roof part and an extended position at least partially above said level of the stationary roof part and a flexible wind deflecting material having an upper end attached to said elongate member and a lower end attached to the stationary roof part.

The elongate member will be moved from its extended position to its retracted position when the movable panel moves in a direction for closing said roof opening. It is possible that the movable panel directly engages a part of the wind deflector for controlling the movement thereof but in other embodiments separate drives for the movable panel and for the wind deflector may be provided which, however, should be synchronised. When the elongate member moves from its extended position to its retracted position the flexible wind deflecting material generally has to be folded or otherwise compacted in a storage space provided near the forward edge of the roof opening below the level of the stationary roof part. As a result of the local aerodynamic conditions and the flexible nature of the wind deflecting material there is a risk that the wind deflecting material is not entirely correctly received in said storage space and that part of the wind deflecting material is pinched between the movable panel and the forward edge of the roof opening. This at one hand may result in damaging the wind deflecting material and at the other hand may cause leakage between the closed movable panel and the surrounding edge of the roof opening. These problems may increase in situations in which the dimensions of the wind deflector (in view of improving its noise attenuating performance) are increased and the wind deflecting material consequently has a larger area.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

An open roof construction for a vehicle of the above type is provided with a wind deflector having a movable control part that extends in parallel to said forward edge and which with a first end is attached to the stationary roof part and which with an opposite second end is connected to the wind deflecting material at an engagement position between the upper and lower ends of the wind deflecting material.

The control part prevents the wind deflecting material from assuming a position (when the elongate member moves to its retracted position) in which latter can be pinched between the movable panel and the forward edge of the roof opening, and thus is capable of assuring that the wind deflecting material is correctly received in said storage space. The control part further may play a role in improving sound characteristics of the open roof construction in general (or the wind deflector in specific) as well as in improving the local appearance of the open roof construction (for example by at least partially hiding constructional parts such as, for example, parts of a drive mechanism for the movable panel and/or for the wind deflector).

In one embodiment the control part in the extended position of the elongate member extends such that its second end is positioned nearer to the forward edge of the roof opening than its first end. This means that the control part, starting from the engagement position, extends away from the wind deflecting material in a direction away from the forward edge and thus is most effective in preventing the wind deflecting material from getting pinched between (the forward edge of) the movable panel and the forward edge of the roof opening.

In one embodiment said control part extends over a length in parallel to said forward edge and said control part is connected to the wind deflecting material at the engagement position continuously over said length. This results in a situation in which the control part very evenly engages the wind deflecting material. However, it is conceivable too that the control part extends intermittently over said length and engages the wind deflecting material at a multitude of spaced locations which together define the engagement location.

The control part may comprise a material having flexible and/or elastic properties, offering an optimised flexibility and/or elasticity of the assembly of wind deflecting material and control part during the process of reception of the wind deflecting material in the storage space. In the present context "flexible and/or elastic" also means to cover embodiments in which the control member is stretchable or otherwise elastically deformable. Alternatively, the control part may comprise a stiff plate-shaped element which by means of a hinge is attached to the stationary roof part. In this alternative embodiment the control part in a very well-defined manner defines the path of the engagement position (and thus of the wind deflecting material), which path will end in the storage space.

In an embodiment of the open roof construction in which the roof opening has two opposite side edges and in which the upper elongate member of the wind deflector has a central part extending over a length in parallel to the forward edge of the roof opening and two end parts each extending over a length substantially in parallel to said side edges of the roof opening, the wind deflecting material may extend over the lengths of the central part and of the end parts of the elongate member, whereas the control part extends only over the length of the central part. Thus the control part only cooperates with (engages) the wind deflecting material at said central part of the elongate member (meaning the part of the wind deflecting member extending in parallel to the forward edge of the roof opening, or in other words extending in a transverse direction of the vehicle).

In an alternative embodiment, however, the wind deflecting material and the control part both extend over the lengths of the central part and of the end parts of the elongate member. In such an alternative embodiment the control part also cooperates with (engages) the wind deflecting material at said end parts of the elongate member (meaning the parts of the wind deflecting member extending in parallel to the side edges of the roof opening, or in other words extending in a longitudinal direction of the vehicle).

Apart from the above embodiments, other embodiments are conceivable too in which the wind deflecting material and control part extend over only part of, or over the full extent of, the mentioned lengths, in any combination.

In one embodiment the wind deflecting material at said engagement position is provided with a reinforcement member extending in parallel to the forward edge of the roof opening. Such a reinforcement member may improve or promote the movement of the wind deflecting material into the receiving space.

Said reinforcement member may be a rod which is housed in a pocket of the wind deflecting material (which for example comprises a loop manufactured by attaching to each other two spaced parts of the wind deflecting material), but it is conceivable too that said reinforcement member is attached to the wind deflecting material by other methods, such as for example knitting, stitching, welding, gluing or any other appropriate means.

The control part may be connected to the wind deflecting material by stitching, sewing, welding, gluing, heat stacking, stapling or any other appropriate means.

In view of obtaining favorable aerodynamic and/or sound reducing characteristics of the wind deflector, at least the part of the wind deflecting material between the engagement position and the upper end may comprise a mesh material; it is conceivable too that the part of the wind deflecting material between the engagement position and the lower end comprises one of a flexible mesh material, a flexible closed woven material or a stiff plate-shaped element which by means of a hinge is attached to the stationary roof part.

In one embodiment at least one of the part of the wind deflecting material between the engagement position and the lower end and the control part defines a sound absorbing member comprising a sound absorbing material. Thus said part of the wind deflecting material or the control part also may play an important role in further reducing disturbing noises.

Said sound absorbing material may be provided on a carrier facing the interior of the vehicle. Such a carrier provides sufficient strength to the control part for effectively controlling the movement of the wind deflecting material into the storage space and for maintaining the sound absorbing material in its desired position in the extended position of the elongate member of the wind deflector. It allows to choose a sound absorbing material which is optimised for its sound absorbing characteristics without having to provide the sound absorbing material with sufficient strength. The sound absorbing material, for example, may comprise a foam material with a closed, half open or open cell structure.

As an alternative said sound absorbing member is an at least partially stiff element hingedly connected to the stationary roof part, in which case it is possible to dismiss with such a carrier.

BRIEF DESCRIPTION OF THE DRAWINGS

Hereinafter aspects of the invention will be elucidated while referring to the drawing, in which:

FIG. 8 illustrates in a side elevational sectional view of yet another alternative embodiment of a wind deflector.

DETAILED DESCRIPTION OF THE ILLUSTRATIVE EMBODIMENTS

Figure 1:
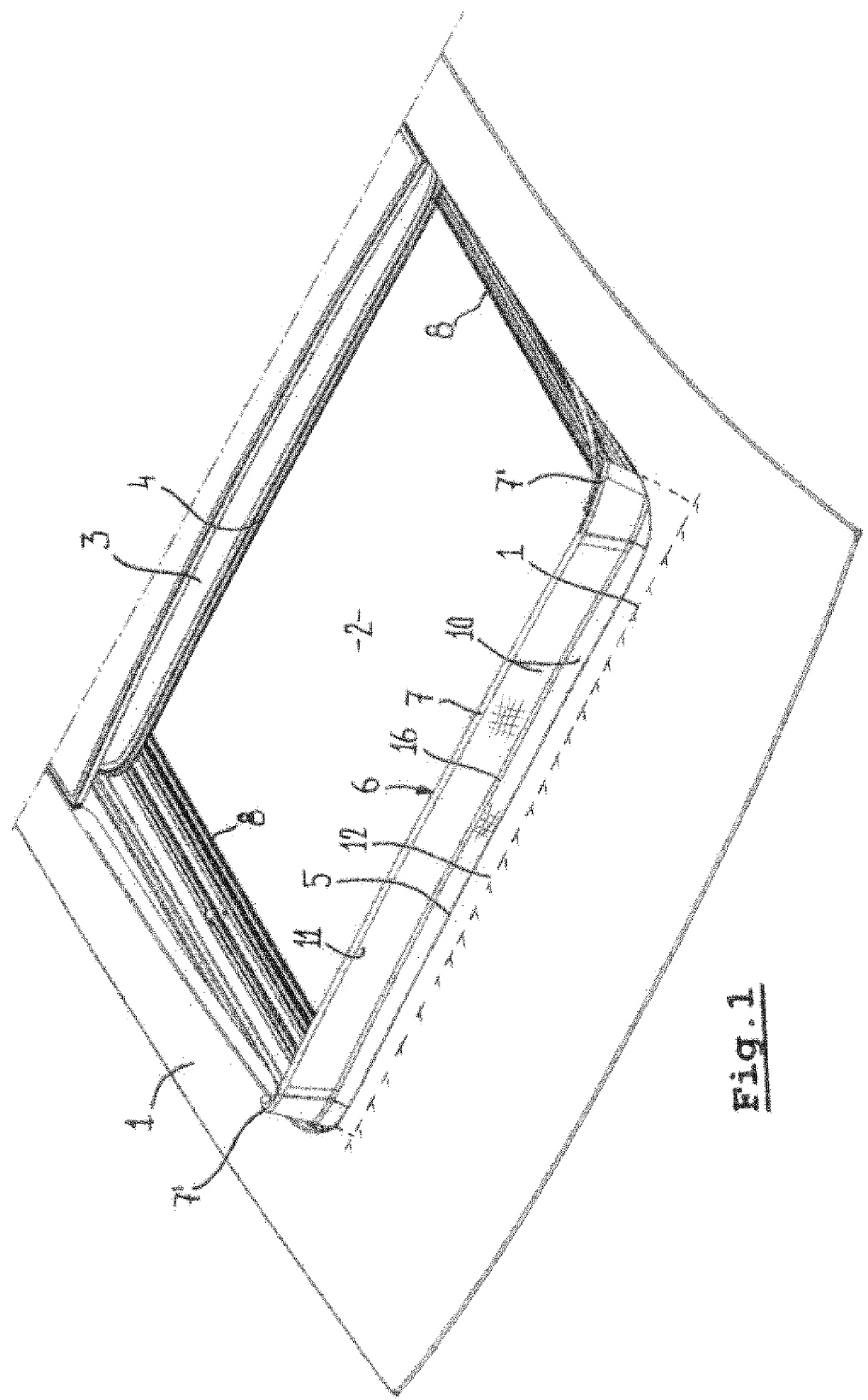
FIG. 1 illustrates a perspective frontal view of an embodiment of the open roof construction.
Figure 2:
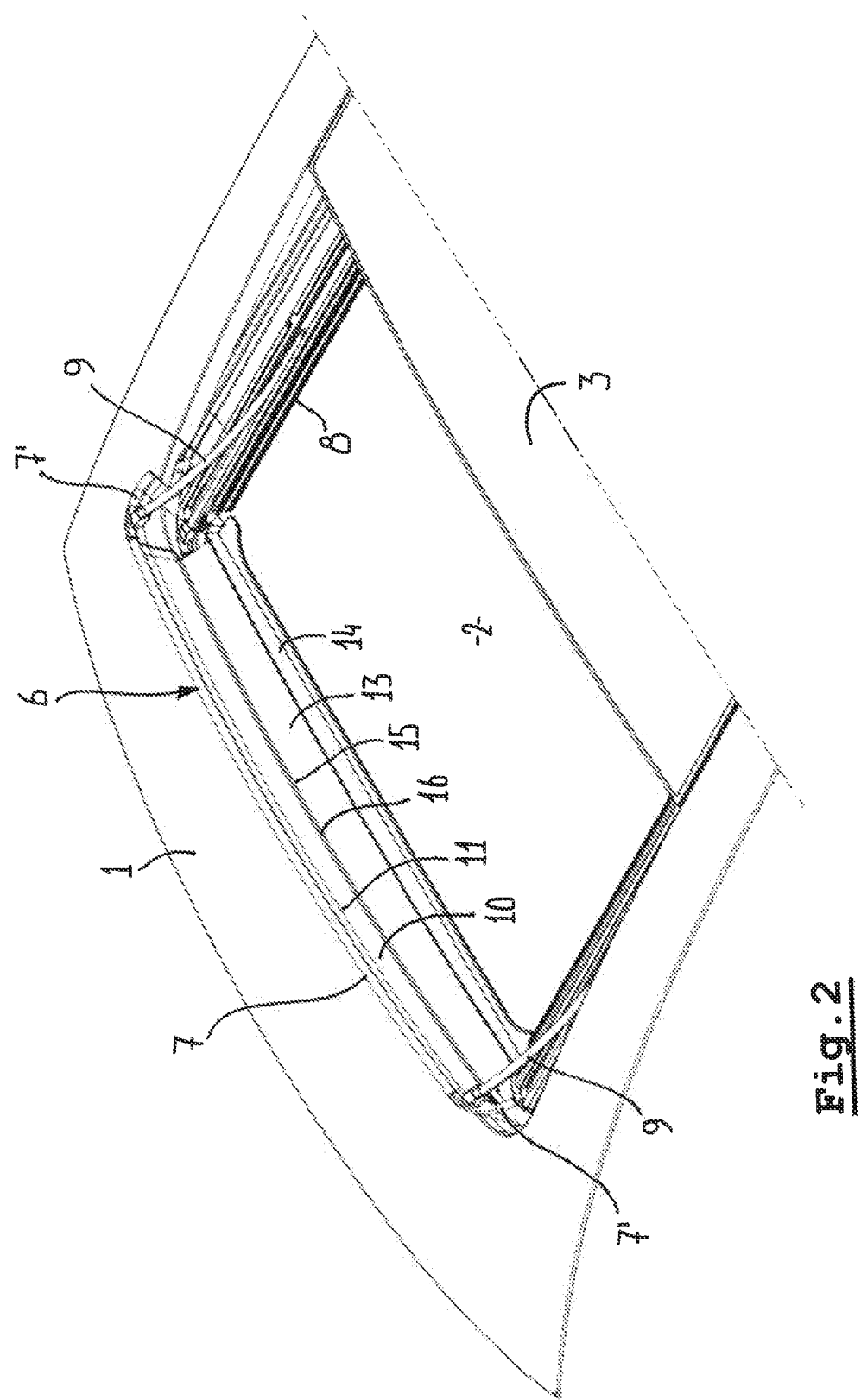
FIG. 2 illustrates a perspective rear view of said open roof construction.

As shown best in FIGS. 1 and 2, an open roof construction for a vehicle comprises a stationary roof part 1 in which a roof opening 2 is provided. In a manner well known in the art (and thus not further specified here) a panel 3 is movably mounted in said stationary roof part 1 for opening and closing said roof opening 2. In the illustrated position the movable panel 3 opens the roof opening 2, but in a closing position a forward edge 4 of the movable panel 3 will be positioned close to a forward edge 5 of the roof opening 2 (for example engaging a seal not represented).

Figure 3:
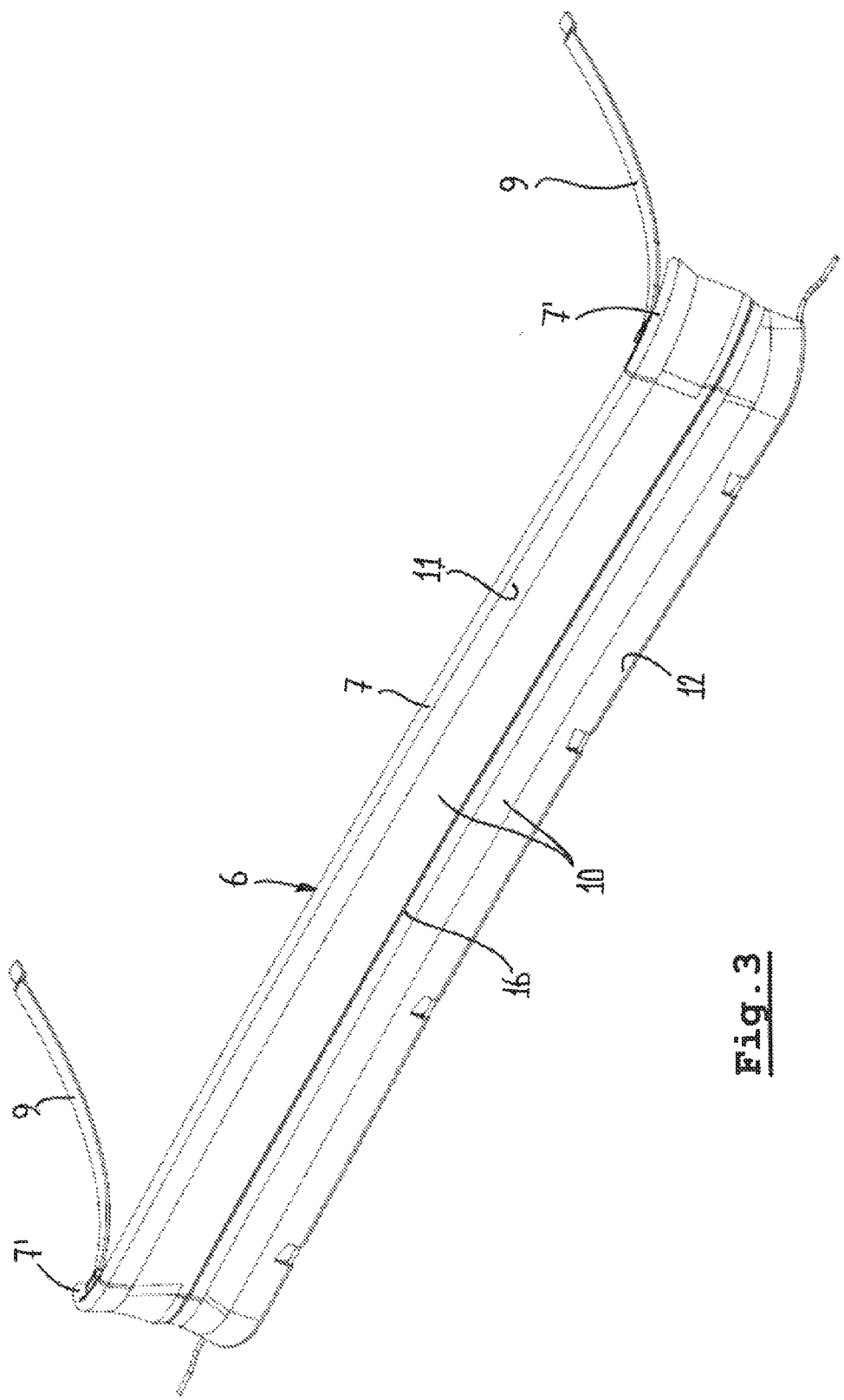
FIG. 3 illustrates a perspective frontal view of a wind deflector for use in the open roof construction.

Referring also to FIG. 3, near to said forward edge 5 of the roof opening 2 a movable wind deflector 6 is provided which, among others, comprises an upper elongate member of which a central part 7 extends substantially in parallel to the forward edge 5 of the roof opening 2 and of which two end parts 7' extend substantially in parallel to corresponding side edges 8 of the roof opening 2. Arms 9 are attached to said elongate member 7,7' and are movable such (by means of a drive mechanism not illustrated but known per se, or by being engaged by the movable panel 3 when it moves to its closed position) that the elongate member 7,7' of the wind deflector 6 is movable between a retracted position below the level of the stationary roof part 1 and an extended position (as illustrated in FIGS. 1 and 2) at least partially above said level of the stationary roof part 1.

The wind deflector 6 further comprises a flexible wind deflecting material 10 having an upper end 11 attached to said elongate member 7,7' and a lower end 12 (indicated in FIG. 1 by a dotted line) attached to the stationary roof part 1 (or a part 1' as will appear later). A movable control part 13 is provided which extends in parallel to said forward edge 5 of the roof opening 2 and which with a first end 14 is attached to the stationary roof part 1 (or a part 1" as will appear later) and which with an opposite second end 15 is connected to the wind deflecting material 10 at an engagement position 16 between the upper and lower ends 11 and 12, respectively, of the wind deflecting material 10 (in FIGS. 1 and 3 said engagement position 16 is represented by a bold line).

It is noted that "movable" with respect to the control part 13 does not require that the control part 13 is provided with any drive mechanism, but merely expresses the ability of the control part 13 to move between different positions (or shapes).

Figure 4:
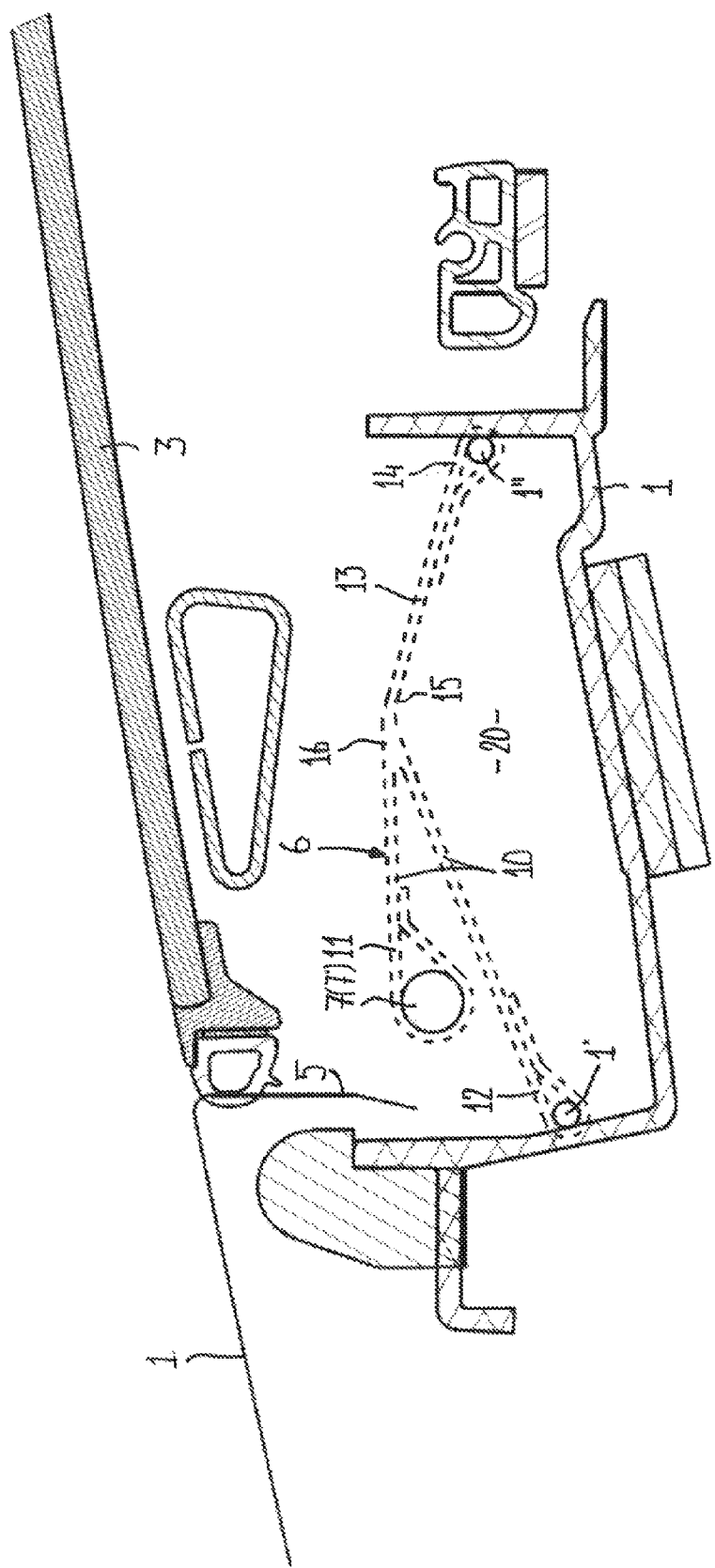
FIGS. 4-6 schematically illustrate three different positions of a wind deflector in a side elevational sectional view.
Figure 5:
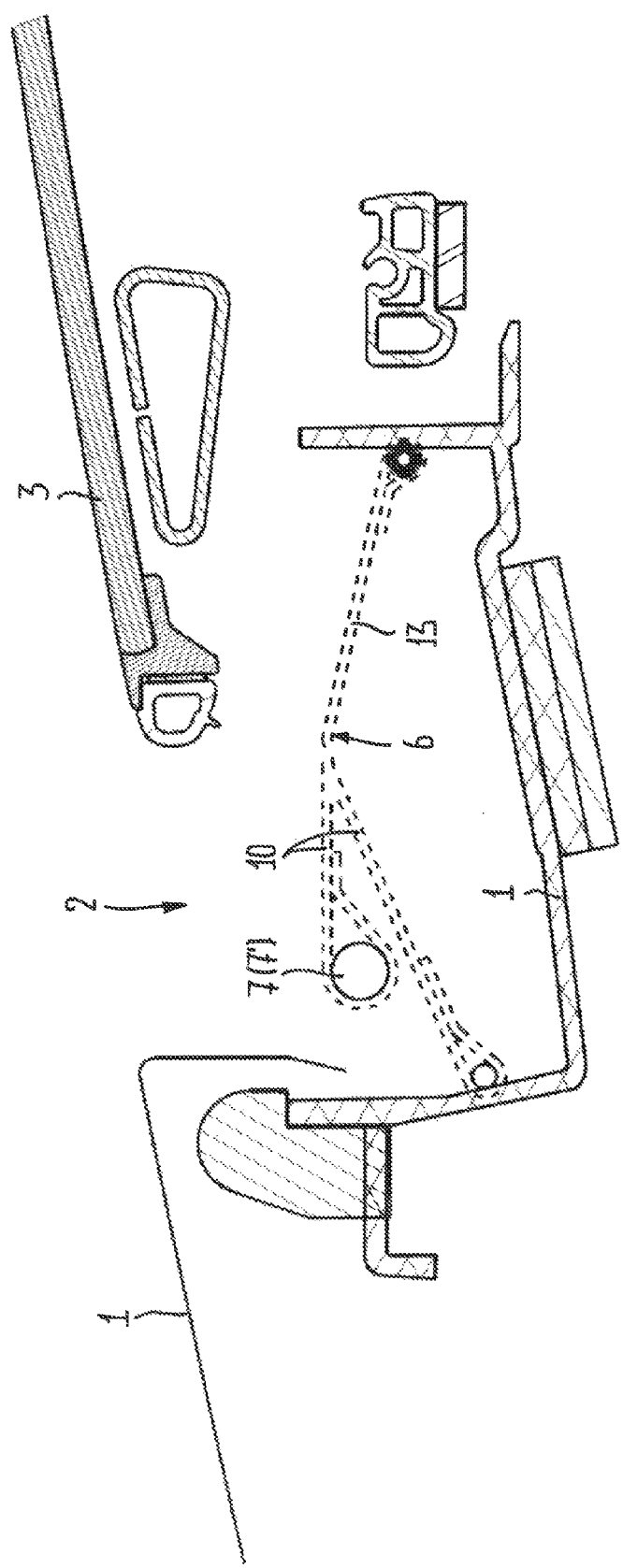
Figure 6:
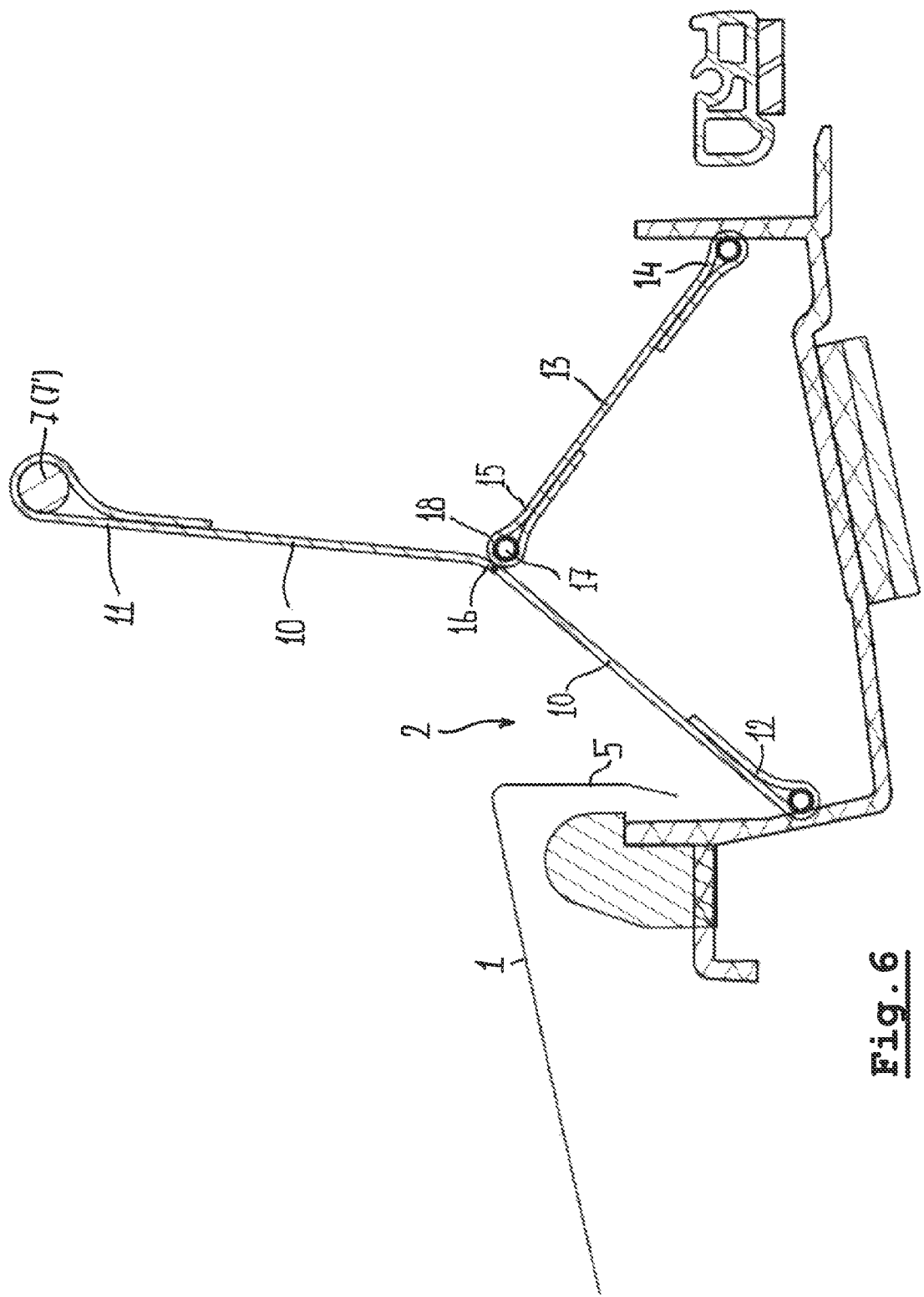

In FIGS. 4-6 three different positions of the wind deflector 6 are illustrated. In FIG. 4 the movable panel 3 fully closes the roof opening 2 and the wind deflector 6 is fully retracted in a storage space 20 near to the forward edge 5 of the roof opening 2 and below the level of the (upper surface of the) stationary roof part 1. The control part 13 has caused the wind deflecting material 10 to fold neatly into said storage space 20. The lower end 12 of the wind deflecting material 10 is attached to a part 1' which (directly or indirectly) is attached to the stationary roof 1. The same applies for the first end 14 of the control part 13 (attached to a part 1").

The control part 13 may comprise a material having flexible and/or elastic properties, which means that the shape of the control part 13 may change. For example, in the position illustrated in FIG. 6 the control part 13 is stretched to a greater length (between its ends 14 and 15) compared to the position illustrated in FIG. 4. As a result, when the wind deflector 6 moves from the position of FIG. 6 towards the position of FIG. 4, the control part 13 will contract and thus will assure that the wind deflecting material 10 is folded neatly into the storage space 20.

In FIG. 5 the movable panel 3 has moved to a position for partially freeing the roof opening 2 and the elongate member 7 (7') of the wind deflector 6 are about to move to a partly extended, higher position. Accordingly the wind deflecting material 10 and the control part 13 will move to a different position (possibly also a different shape, as stated before with respect to a flexible and/or elastic control part 13).

It is noted that in FIGS. 4 and 5 the wind deflecting material 10 and the control part 13 are illustrated in broken lines for schematically indicating that, in the shown positions of the wind deflector 6, these parts also may have a different shape when they, depending for example from the materials used, are substantially slack in these positions.

In FIG. 6 the elongate member 7 (7') and thus the entire wind deflector 6 has reached the fully extended position. In this FIG. 6 it is clearly visible that the control part 13 extends such that its second end 15 is positioned nearer to the forward edge 5 of the roof opening 2 than its first end 14, compared to the situations illustrated in FIGS. 4 and 5.

As stated before, the roof opening 2 has two opposite side edges 8 and the upper elongate member of the wind deflector 6 has a central part 7 extending over a length in parallel to the forward edge 5 of the roof opening and two end parts 7' each extending over a length substantially in parallel to said side edges 8 of the roof opening 2. In the embodiment illustrated best in FIG. 2 the wind deflecting material 10 extends over the lengths of the central part 7 and of the end parts 7' of the elongate member, whereas the control part 13 extends only over the length of the central part 7.

Figure 7:
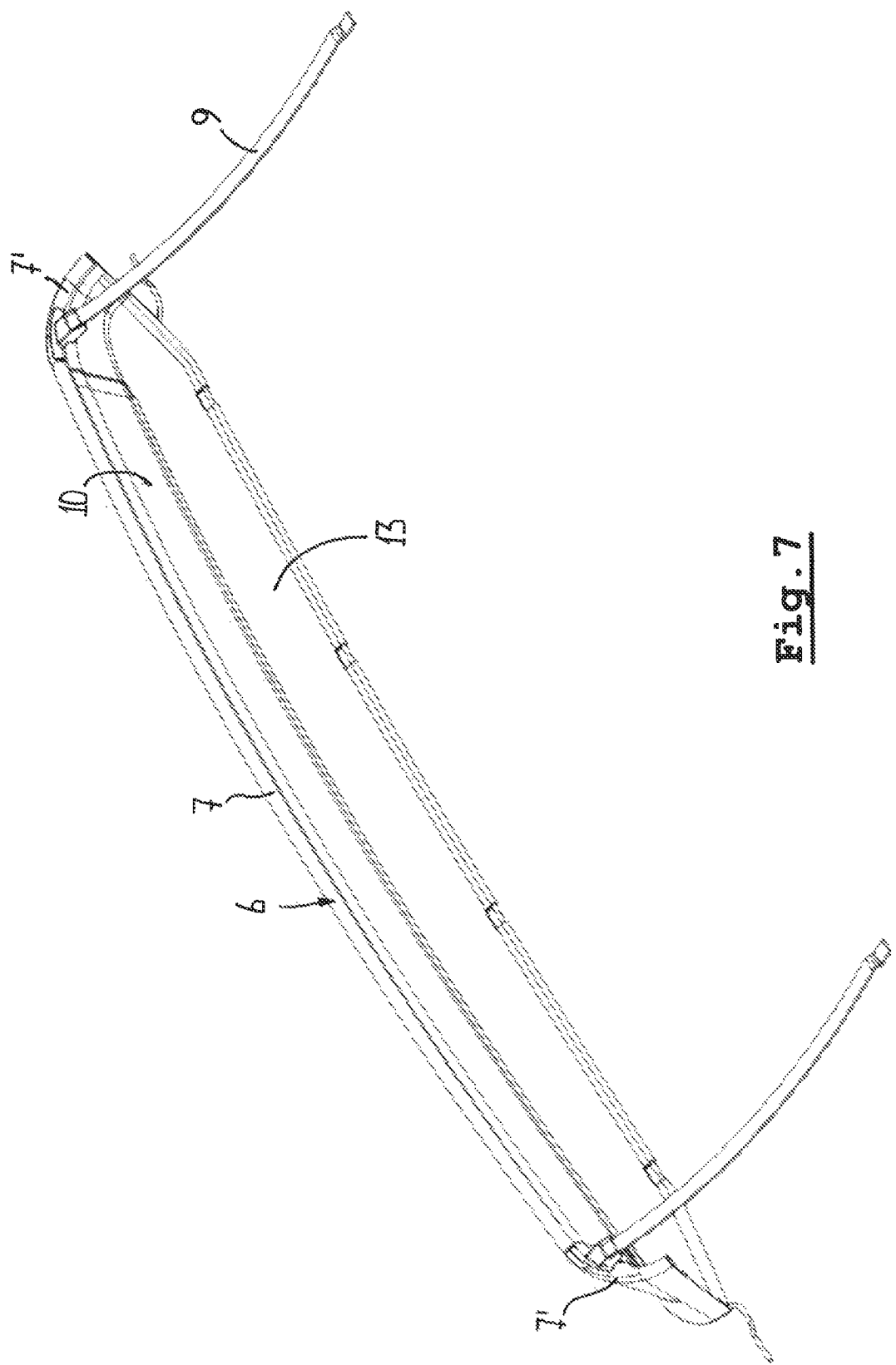
FIG. 7 illustrates a perspective rear view of an alternative wind deflector.

FIG. 7 shows an alternative embodiment of the wind deflector 6 in which the wind deflecting material 10 and the control part 13 both extend over the lengths of the central part 7 and of the end parts 7' of the elongate member.

Further to the above mentioned (and illustrated) embodiments, many other embodiments are conceivable in which the wind deflecting material 10 and control part 13 extend over only part of, or over the full extent of, the mentioned lengths of parts 7, 7', in any combination. For example, in one embodiment (not illustrated but readily comprehensible by those skilled in the art) the wind deflecting material 10 and the control part 13 only extend over the length of the central part 7.

Generally the control part 13 will extend continuously over its entire length along the engagement position, as illustrated, but is conceivable too that it extends intermittently (thus defining an alternating succession of places where the control part 13 is and is not connected to the wind deflecting material).

The control part 13 may be connected to the wind deflecting material 10 by stitching, sewing, welding, gluing, heat stacking, stapling or any other appropriate means.

As an alternative (or in addition) to the control part 13 comprising a flexible and/or elastic material (as mentioned before), the control part 13 also may comprise a stiff plate-shaped element which by means of a hinge (for example defined by part 1" in FIG. 4) with one end is attached to the stationary roof part 1 and which with an opposite end is attached to the wind deflecting material 10, for example using any of the above mentioned (or other appropriate) techniques. A control part 13 which partly comprises a flexible and/or elastic material and partly comprises such a stiff plate-shaped element, is conceivable too.

As illustrated schematically in FIG. 6, the wind deflecting material 10 at said engagement position 16 may be provided with a reinforcement member 17 (for example a rod) extending in parallel to the forward edge 5 of the roof opening 2. Said reinforcement member 17 may be housed in a pocket 18 of the wind deflecting material 10 or may be attached to the wind deflecting material 10 in another manner, e.g. by knitting, stitching, welding or gluing.

Referring also back to FIG. 1, for achieving the desired characteristics (aerodynamically and acoustically) at least the part of the wind deflecting material 10 between the engagement position 16 and the upper end 11 generally will comprise a mesh material. The part of the wind deflecting material 10 between the engagement position 16 and the lower end 12 generally will comprise one of a flexible mesh material (the mesh material being represented by a portions thereof illustrated in FIG. 1), a flexible closed woven material, a flexible elastic material or a stiff plate-shaped element which by means of a hinge (for example defined by part 1' in FIG. 4) is attached to the stationary roof part 1.

Referring to FIG. 8, an embodiment is illustrated in which the part of the wind deflecting material 10 between the engagement position 16 and the lower end 12 as well as the control part 13 define sound absorbing members comprising a sound absorbing material 19. In this embodiment the respective part of the wind deflecting material 10 and the control part 13 define stiff plate-shaped carriers facing the interior of the vehicle and supporting the sound absorbing material 19. As an alternative (not illustrated) the sound absorbing material itself functions as said part (between second end 15 and lower end 12) of the wind deflecting material and as control part.

The sound absorbing material 19 may comprise a foam material with a closed, half open or open cell structure, or any other suitable material for absorbing sound or noise, depending on the required characteristics.

The control part 13 not only controls the movement of the wind deflecting material 10 into the storage space 20 such as to prevent the wind deflecting material 10 from being pinched between the forward edges 4 and 5 of the movable panel 3 and roof opening 2, respectively, but also may provide aerodynamic and acoustic improvements.

Further the control part 13 may keep interior parts of the open roof construction out of sight. This, especially, is advantageous when the panel 3 is in an open position. For this reason the control part may have a specific color (for example black or the color of the vehicle) and/or a specific styled shape for improving the appearance of the open roof construction. Further it will be handy when said control part 13 is made of a material fit to be used in a so-called wet area of the open roof construction.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

What is claimed is:

1. An open roof construction for a vehicle, comprising:
   a stationary roof part having a roof opening provided therein, and wherein said roof opening has a forward edge and two opposite side edges;

a panel movably mounted in said stationary roof part configured to open and close said roof opening;

a movable wind deflector is disposed proximate said forward edge, which wind deflector comprises:

an upper elongate member extending substantially parallel to said forward edge which is movable between a retracted position below a level of the stationary roof part and an extended position at least partially above said level of the stationary roof part;

a flexible wind deflecting material having an upper end attached to said elongate member and a lower end attached to the stationary roof part; and a movable control part that extends parallel to said forward edge and which with a first end is attached to the stationary roof part and which with an opposite second end is connected to the wind deflecting material at an engagement position between the upper and lower ends of the wind deflecting material, the movable control part from the first end to the second end extending along a majority of a distance between the opposite side edges.

2. The open roof construction according to claim 1, wherein in the extended position of the elongate member the control part extends such that the second end is positioned nearer to the forward edge of the roof opening than the first end.

3. The open roof construction according to claim 1, wherein said control part extends over a length parallel to said forward edge and wherein said control part is connected to the wind deflecting material at the engagement position continuously over said length.

4. The open roof construction according to claim 1, wherein the control part comprises a material having flexible and/or elastic properties.

5. The open roof construction according to claim 1, wherein the control part comprises a stiff plate-shaped element which is attached to the stationary roof part with a hinge.

6. The open roof construction according to claim 1, wherein the upper elongate member of the wind deflector has a central part extending over a length parallel to the forward edge of the roof opening and two end parts each extending over a length substantially parallel to said side edges of the roof opening, wherein the wind deflecting material extends over the lengths of the central part and of the end parts of the elongate member, whereas the control part extends only over the length of the central part.

7. The open roof construction according to claim 1, wherein the upper elongate member of the wind deflector has a central part extending over a length in parallel to the forward edge of the roof opening and two end parts each extending over a length substantially in parallel to said side edges of the roof opening, wherein the wind deflecting material and the control part both extend over the lengths of the central part and of the end parts of the elongate member.

8. The open roof construction according to claim 1, wherein the wind deflecting material at said engagement position is provided with a reinforcement member extending parallel to the forward edge of the roof opening.

9. The open roof construction according to claim 7, wherein said reinforcement member is a rod which is housed in a pocket of the wind deflecting material.

10. The open roof construction according to claim 8, wherein said reinforcement member is attached to the wind deflecting material by knitting, stitching, welding, or gluing.

11. The open roof construction according to claim 1, wherein at least the part of the wind deflecting material between the engagement position and the upper end comprises a mesh material.

12. The open roof construction according to claim 1, wherein the part of the wind deflecting material between the engagement position and the lower end comprises one of a flexible mesh material, a flexible closed woven material, a flexible elastic material or a stiff plate-shaped element which is attached to the stationary roof part with a hinge.

13. The open roof construction according to claim 1, wherein at least one of the control part and the part of the wind deflecting material between the engagement position and the lower end defines a sound absorbing member comprising a sound absorbing material.

14. The open roof construction according to claim 13, wherein both the control part and the part of the wind deflecting material between the engagement position and the lower end define a sound absorbing member.

15. The open roof construction according to claim 13, wherein said sound absorbing material is provided on a carrier facing the interior of the vehicle.

16. The open roof construction according to claim 13, wherein the sound absorbing material comprises a foam material with a closed, half open or open cell structure.

17. The open roof construction according to claim 13, wherein said sound absorbing member is an at least partially stiff element hingedly connected to the stationary roof part.

18. The open roof construction according to claim 1, wherein the control part is connected to the wind deflecting material by stitching, sewing, welding, gluing, heat stacking, or stapling.

19. A wind deflector for a roof opening in a vehicle, comprising:

an upper elongate member configured to move between a retracted position and an extended position wherein at least a portion extends above a stationary roof part having the roof opening;

a flexible wind deflecting material having an upper end attached to said elongate member and a lower end configured to be attached to the stationary roof part or a portion connected thereto; and a movable control part extending parallel to said upper elongate member and which with a first end is configured to be attached to the stationary roof part or a portion connected thereto and which with an opposite second end is connected to the wind deflecting material at an engagement position between the upper and lower ends of the wind deflecting material, the moveable control part from the first end to the second end extending along a majority of a length of the upper elongate member.

20. The wind deflector according to claim 19, wherein said control part extends over a length parallel to said upper elongate member and wherein said control part is connected to the wind deflecting material at the engagement position continuously over said length.

21. The wind deflector according to claim 19, wherein the control part comprises a material having flexible and/or elastic properties.

22. The wind deflector according to claim 19, wherein the control part comprises a stiff plate-shaped element.

23. The wind deflector according to claim 19, wherein the upper elongate member of the wind deflector has a central part extending over a length and two end parts each extending over a length substantially perpendicular the central part, wherein the wind deflecting material extends over the lengths of the central part and of the end parts of the elongate member and the control part extends only over the length of the central part.

24. The wind deflector according to claim 19, wherein the upper elongate member of the wind deflector has a central part extending over a length and two end parts each extending over a length substantially perpendicular the central part, wherein the wind deflecting material extends over the lengths of the central part and of the end parts of the elongate member, wherein the wind deflecting material and the control part both extend over the lengths of the central part and of the end parts of the elongate member.

25. The wind deflector according to claim 19, wherein the wind deflecting material at said engagement position is provided with a reinforcement member extending parallel to the central part.

26. The wind deflector according to claim 25, wherein said reinforcement member is a rod which is housed in a pocket of the wind deflecting material.

27. The wind deflector according to claim 19, wherein at least the part of the wind deflecting material between the engagement position and the upper end comprises a mesh material.

28. The wind deflector according to claim 19, wherein the part of the wind deflecting material between the engagement position and the lower end comprises one of a flexible mesh material, a flexible closed woven material, a flexible elastic material or a stiff plate-shaped element.

29. The wind deflector according to claim 19, wherein at least one of the control part and the part of the wind deflecting material between the engagement position and the lower end defines a sound absorbing member comprising a sound absorbing material.

30. The wind deflector according to claim 29, wherein both the control part and the part of the wind deflecting material between the engagement position and the lower end and the control part define a sound absorbing member.

31. The wind deflector according to claim 29, wherein said sound absorbing material is provided on a carrier.

32. The wind deflector according to claim 29, wherein the sound absorbing material comprises a foam material with a closed, half open or open cell structure.

33. The wind deflector according to claim 29, wherein said sound absorbing member is an at least partially stiff element hingedly connectable to the stationary roof part or a portion connected thereto.

34. The wind deflector of claim 19 wherein the movable control part extends continuously along the majority of the length of the upper elongate member.

* * * * *